United States Patent Office 3,109,520
Patented Nov. 5, 1963

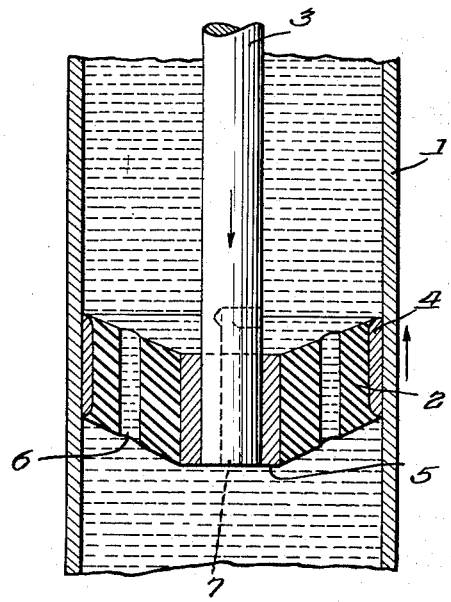
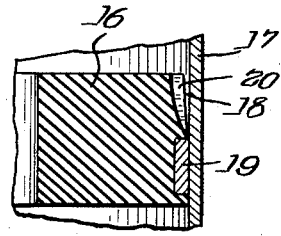
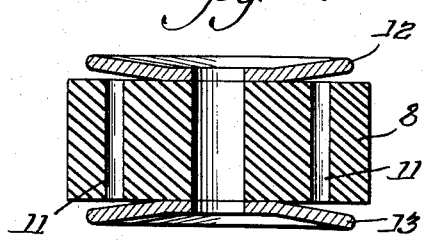
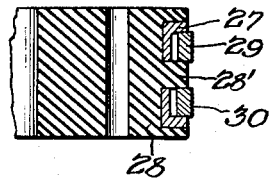
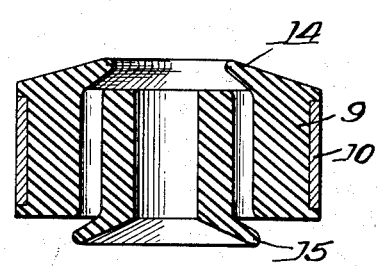
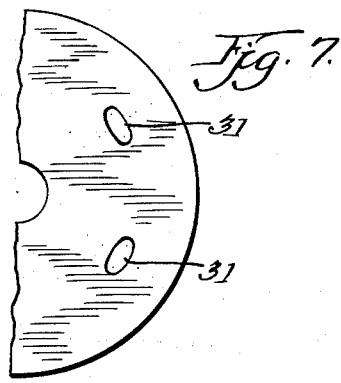

3,109,520
HYDRAULIC SHOCK ABSORBER COMPRISING AN ELASTIC PISTON
Paul Vossieck, Burscheid, near Cologne, Germany, assignor to Goetzewerke Friedrich Goetze Aktiengesellschaft, Burscheid, near Cologne, Germany, a corporation of Germany
Filed Sept. 19, 1961, Ser. No. 139,121
Claims priority, application Germany Oct. 10, 1960
9 Claims. (Cl. 188—88)

This invention is concerned with a hydraulic shock absorber comprising an elastic piston, particularly for use in connection with motor vehicles.

Telescoping hydraulic shock absorbers have become known in which the friction between the piston and the cylinder wall is utilized for the damping of load fluctuations. The piston employed, which is slidably arranged in the cylinder, is composed of a plurality of stacked individual rubber plates forming a brake disk. It has also been proposed to form the inner part of the brake disk cone-shaped for the purpose of respectively increasing or decreasing in different directions in the shift resistance within the disk. However, the laminated configuration of the circumference of the piston exerted a detrimental influence with respect to the guidance thereof within the cylinder. It has moreover been found that the individual brake plates wear after a relatively short time to such extent that an effective damping cannot be effected any more.

It is in accordance with the invention proposed to provide for hydraulic shock absorbers an elastic piston the inner part of which is displaceable with respect to the outer peripheral part, the displacement being such that the cross-sectional areas of the fluid communicating passages are increased or decreased depending upon the direction of displacement. It is thereby possible to adapt to the prevailing requirements the velocity of the hydraulic damping fluid passing through the communicating ducts from one to another chamber.

The free ends of the flow passages may be terminated by lips, particularly when such passages are provided within the piston. Such lips permit regulation of the flow resistance of the damping fluid in the simplest manner, for example, to increase the flow thereof in one direction. This effect may be supported by conical formation of the flow passages.

The piston may be advantageously limited at its ends by stop plates, which may be arcuate if desired, so as to respectively limit the axial motion thereof or to vary the cross-sectional area of the communicating passages, thus providing a further possibility for varying the flow resistance. Upon using stop plates, the piston may be made wholly of elastic material; it is thereby particularly advantageous to make the piston of different hardness throughout given zones thereof. The stop plates can moreover be substituted by valve-like lips made of the material of the piston. It is in such case feasible to form the lips either of the material of the piston body and to reinforce or stiffen such lips by means of metal parts or to make them of a material which is harder than that of the piston body.

The invention will now be explained with reference to the accompanying drawing showing examples of embodiments thereof.

FIG. 1 shows in cross-sectional view part of a shock absorber;

FIGS. 2 and 3 represent cross-sectional views of pistons;

FIGS. 4, 5 and 6 respectively illustrate in cross-sectional fractional views various embodiments of pistons; and FIG. 7 indicates a partial elevational view of a piston.

The shock absorber shown in cross-sectional view in FIG. 1, comprises the absorber tube or cylinder 1 and the piston 2 which is connected with the piston rod 3. The piston 2 is composed of an elastic central portion, preferably made of rubber, and two rings indicated respectively at 4 and 5. The piston 2 is illustrated in working position (stroke), whereby the ring 4 which delimits the outer peripheral surface of the piston, is axially displaced with respect to the inner part which is delimited by the ring 5. The axial displacement between the inner superficies and outer superficies effects respectively an increase or a decrease of the cross-sectional areas of the flow passages 6. The by-pass flow passage 7 formed in the piston permits a constant flow of the hydraulic damping fluid. The arrows indicate the directions of motion of the parts responsive to fluctuations of the load, that, is responsive to the action of the wheel (not shown) with which the shock absorber is cooperatively connected.

Further possibilities of changing the cross-sectional areas of the flow passages formed in the piston are shown in FIGS. 2 and 3.

The elastic piston 8 is fitted on a piston rod (not shown) without having an inner metal ring such as indicated in FIG. 1 at 5, and the outer metallic stiffening of reinforcing ring such as indicated in FIG. 1 at 4, is likewise omitted. The piston shown in FIG. 3 is however provided with at least one outer hard material sleeve or ring 10 which is vulcanized thereto. In the structure according to FIG. 2, the cross-sectional areas of the flow passages 11 are changed by the action of metallic terminal plates 12, 13, responsive to displacement of the outer piston part 8 with respect to the inner piston part. A similar effect is obtained in case of the piston structure shown in FIG. 3, wherein annular lips 14, 15 take the place of the terminal plates of the embodiment of FIG. 2, the lips 14, 15 being made of the same material as the remaining parts of the piston body and being integral therewith.

The metallic terminal plates may be of plane configuration and the piston body may be made of conical shape.

FIG. 4 shows in fractional view an elastic piston 16 which is provided with a radially inwardly recessed portion forming with the inner wall of the cylinder 17 an annular gap 18 through which the hydraulic fluid can flow from one to the other working space, the upper part of the piston being thus of slightly cone shaped configuration. The piston 16 is partially stiffened by a ring 19 to avoid undesired binding thereof in the cylinder 17. Grooves or slots 20 are formed in the outer recessed part of the piston which are, depending upon the direction of motion of the piston, operative to widen or to restrict the annular gap 18, thereby determining the flow resistance of the damping fluid.

In the embodiment illustrated in FIG. 5, the piston 21 is provided with a cross-sectionally tapering flow passage 22 terminating in a lip-shaped part 23 which constricts responsive to reversed motion of the piston (idling stroke) thereby narrowing the flow passage 22. During the working stroke, the liquid enters into the flow passage 22 at 24, resulting in widening thereof in the area of the lip 23. The piston 21 is peripherally provided with a cross-sectionally U-shaped ring 25 containing circular rubber rings 26.

In the embodiment according to FIG. 6, there are provided two cross-sectionally L-shaped peripherally disposed inserts 27, the material of the piston 28 extending radially outwardly in the form of an annular web 28' to the peripheral slide surface of the piston. Piston rings 29 and 30 are disposed in the recesses formed by the respective inserts 27.

As shown in FIG. 7, the flow passages for the hydraulic fluid are of oval configuration. Accordingly, these passages will be narrowed or widened responsive to displacement of the outer piston part relative to the inner piston part according to the direction of piston motion, thereby altering the cross-sectional areas of the respective flow passages for the purpose described.

The various embodiments may be used individually or in combination as desired.

Changes may be made within the scope and spirit of the appended claims which define what is believed to be new and desired to have protected by Letters Patent.

I claim:

1. A hydraulic shock absorber comprising a casing forming a cylinder, a piston having a body made of elastic material movably disposed in said cylinder, hydraulic fluid disposed at opposite sides of said piston and filling said cylinder, ducts formed in said piston body for the passage of hydraulic fluid therethrough from one side of the piston to the other, by means of which fluid flow the shock absorber action is derived, and means responsive to fluctuations of a load, connected respectively to said casing and said piston, for applying to said piston centrally thereof a force so as to move said piston within and relative to said cylinder, said force being effective to axially displace the inner central portion of said piston with respect to the outer peripheral portion thereof to displace the inner superficies of the piston with respect to the outer superficies thereof and thereby effect a change in the cross-sectional areas of said ducts for the purpose of regulating the passage of hydraulic fluid therethrough depending upon the direction of motion and velocity of said piston, and means forming lip-shaped extensions terminating said ducts.

2. A shock absorber having a piston as set forth in claim 1, comprising at least one ring of hard material vulcanized to said piston at least peripherally thereof.

3. A shock absorber having a piston as set forth in claim 1, the circumference of said piston being formed partially of metal and partially of an elastic material.

4. A shock absorber having a piston as set forth in claim 1, at least one groove being formed circumferentially of said piston for disposing sealing means therein.

5. A shock absorber having a piston as set forth in claim 1, wherein said ducts are formed by conically shaped bores.

6. A shock absorber having a piston as set forth in claim 1, wherein said lip-shaped extensions comprise plate means for impeding the passage of hydraulic fluid through said ducts responsive to displacement of said piston in at least one direction of motion thereof.

7. A shock absorber having a piston as set forth in claim 1, wherein said piston body exhibits zones of different hardness of the material thereof.

8. A shock absorber having a piston as set forth in claim 1, comprising a piston rod constituting the means for applying to the piston a force so as to move the piston, said piston body directly embracing said piston rod with press fit.

9. A hydraulic shock absorber comprising a casing forming a cylinder, a piston having a body made of elastic material movably disposed in said cylinder, hydraulic fluid disposed at opposite sides of said piston and filling said cylinder, ducts formed in said piston body for the passage of hydraulic fluid therethrough from one side of the piston to the other, by means of which fluid flow the shock absorber action is derived, and means responsive to fluctuations of a load, connected respectively to said casing and said piston, for applying to said piston centrally thereof a force so as to move said piston within and relative to said cylinder, said force being effective to axially displace the inner central portion of said piston with respect to the outer peripheral portion thereof, to displace the inner superficies of the piston with respect to the outer superficies thereof and thereby effect a change in the cross-sectional areas of said ducts for the purpose of regulating the passage of hydraulic fluid therethrough depending upon the direction of motion and velocity of said piston, and means formed of the material of said piston body forming valve-like lips for impeding the passage of hydraulic fluid through said ducts responsive to displacement of said piston in at least one direction of motion thereof.

References Cited in the file of this patent

UNITED STATES PATENTS

| 1,282,712 | Barrell | Oct. 22, 1918 |
| 2,088,450 | Tea et al. | July 27, 1937 |
| 2,729,440 | Wales | Jan. 6, 1956 |
| 2,752,149 | Forcellini | June 26, 1956 |
| 2,912,069 | Dillenburger | Nov. 10, 1959 |

FOREIGN PATENTS

| 21,384 | Great Britain | Oct. 5, 1904 |
| 1,068,224 | France | Feb. 3, 1954 |
| 1,109,456 | France | Sept. 28, 1955 |